United States Patent [19]
Howard

[11] Patent Number: 6,098,079
[45] Date of Patent: Aug. 1, 2000

[54] FILE VERSION RECONCILIATION USING HASH CODES

[75] Inventor: John H. Howard, Cambridge, Mass.

[73] Assignee: Mitsubishi Electric Information Technology Center America, Inc. (ITA), Cambridge, Mass.

[21] Appl. No.: 09/054,330

[22] Filed: Apr. 2, 1998

[51] Int. Cl.[7] .................................. G06F 17/30
[52] U.S. Cl. .............. 707/205; 707/6; 364/228; 340/172
[58] Field of Search ................... 707/6, 205, 2, 707/10, 7, 102, 103, 8, 201; 364/222, 228, 282, 281; 340/172; 380/25; 709/215

[56] References Cited

U.S. PATENT DOCUMENTS

| | | | |
|---|---|---|---|
| 3,668,647 | 6/1972 | Evangelisti et al. | 340/172 |
| 5,333,315 | 7/1994 | Saether et al. | 364/228 |
| 5,754,844 | 5/1998 | Fuller | 707/6 |
| 5,778,068 | 7/1998 | Johnson et al. | 380/25 |
| 5,778,393 | 7/1998 | Blea et al. | 707/205 |

*Primary Examiner*—Wayne Amsbury
*Assistant Examiner*—Thu-Thao Havan
*Attorney, Agent, or Firm*—Dirk Brinkman

[57] ABSTRACT

A file reconciliation process in a distributed file system uses a set of journal or log files to track the history of file modification at each of different sites, or sets of directories, in a computer system. During reconciliation, sequences of version entries associated with each file in each journal are updated and compared to determine whether (1) a conflict exists for any of the files involved in the reconciliation, and (2) if not, which version of the file is the current version. The version entries contain a hash code or digest that to a high probability uniquely identifies the contents of a file. Sequences of hash codes are used to identify the sequence of file versions. Masks and site indicator fields are included in the journal files and used to track which journal files have copies of version entries for the purpose of deleting version entries when they become obsolete.

10 Claims, 5 Drawing Sheets

SITE 1:

| | | |
|---|---|---|
| file1.xxx | f1date | f1time |
| file2.xxx | f2date | f2time |
| file3.xxx | f3date | f3time |
| sub1.dir | s1date | s1time |
|   file5.xxx | f5date | f5time |
|   file6.xxx | f6date | f6time |
| site1.jnl | j1date | j1time |

FIG. 1

SITE 2:

| | | |
|---|---|---|
| file1.xxx | f1date | f1time |
| file2.xxx | f2date | f2time |
| file3.xxx | f3date | f3time |
| sub1.dir | s1date | s1time |
|   file5.xxx | f5date | f5time |
|   file6.xxx | f6date | f6time |
| site2.jnl | j2date | j2time |

FIG. 2

Journal File
<Header>
<Site Entry 1>
< ↓ >
<Site Entry n>
<Version Entry 1>
< ↓ >
<Version Entry m>

FIG. 3

Header

Journal of <sitename> (<systype>) - <programname>

FIG. 4

Version Entry

<verb> <date> <time> <name><t> ?sites dx=<digest> <remarks>

FIG. 5

Site Entry $ <date> <time> <name><sitename> ?mask

FILE VERSION RECONCILIATION USING HASH CODES

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related generally to the field of distributed file systems for computers, and more specifically to the reconciliation of different versions of files that may exist at different storage locations within a distributed computer system.

It is increasingly common for computer systems to use distributed file systems for the storage and retrieval of data files. This trend is displacing traditional centralized file systems, in which data files are stored on magnetic disks accessible only to application programs executing on a single computer closely coupled to the disks. As the functionality of computers has increased and their costs decreased, overall computer system performance has benefitted from allowing copies of data files to exist in multiple locations. First-generation examples of these distributed file systems involve desktop workstations or personal computers connected to a local file server. Storage of files on the desktop computer enables fast execution of programs running on the desktop computers, while the existence of these files on the file server provides for data file sharing, a function required in many distributed application programs used in organizations. More recent systems enable similar coordination of data among mobile users having portable computers, users at workstations, and a central data repository that may exist in an organization.

In distributed file systems, it is generally possible that at some time there are two or more different versions of a file at different locations, and that only one version is the current or correct version to be used by all users of the system. Because of this possibility, a mechanism is employed in distributed file systems to ensure file system coherence. A file system is coherent if the correct version of a file is provided to an application program despite the possible existence of outdated or otherwise incorrect versions in the system.

One approach to maintaining file system coherence is direct user-controlled file transfer. One example of this approach is electronic mail. Other examples include a public-domain file-transfer protocol known as Kermit, and a product known as Laplink® of Traveling Software, Inc. of Washington. The Laplink® program is used primarily to transfer files between a portable computer and either a desktop computer or another portable computer. All of these file-transfer procedures allow the user of a computer great control over the file-transfer process. However, they are generally not tailored specifically to the problem of file system coherence. The user bears substantial responsibility for anticipating conflicts among versions of files, detecting such conflicts when they occur, purging obsolete versions of files, and ensuring that file updates are timely distributed to the points in the system where they are needed.

Another class of coherence techniques uses shadowing or immediate updating of data files. Such techniques are used in systems such as Network File System (NFS). In systems using these techniques, file updates are broadcast to all storage locations immediately, and in some cases the use of a file being updated is prevented until all copies have been updated. This conservative approach to maintaining coherence eliminates the possibility of conflicts and is largely transparent to the user. However, it also tends to reduce system performance and to cause other problems related to its relative lack of user control. Additionally, the technique is not well suited for mobile users who are only intermittently connected to the broader computer system.

A third general class of coherence techniques relies on the existence of a "special location" for data files within the computer system. For example, a single file server may be the only point in the system from which the correct version of a file can be obtained. Thus the file server must be involved in all file reconciliations. A common example is embodied in a program known as "Briefcase" that is included in the Windows®95 operating system distributed by Microsoft Corp. of Washington. Briefcase can be used to maintain data file coherence between a desktop personal computer and a portable computer. The desktop machine is treated as the primary data file storage site, and the portable computer as a "briefcase" which temporarily holds copies of files obtained from the desktop computer, the copies or updated versions being returned to the desktop computer upon a user's return to the office environment.

Systems which require a special location to coordinate updates fail when the special location is broken or inaccessible. Version vector systems such as CODA and Bayou avoid using a special location by generating at each site an ascending sequence of version numbers, associating a new version number with each object it creates or updates. Journal entries contain the ID of the site which performed the update and that site's version number for the update. Each current object is associated with a vector, indexed by site, of the individual sites' version numbers. Vector comparisons can result in one of three answers: all components of one vector less than or equal the corresponding components of the other vector, the reverse, or some less and some greater. The latter case is used to detect inconsistent updates.

Yet another approach to the data file coherence problem is described in U.S. Pat. No. 5,600,834 to Howard, which issued Feb. 4, 1997 and is assigned to Mitsubishi Electric Information Technology Center America, Inc. of Cambridge, Mass. A file reconciliation technique is described that uses a combination of automatic mechanisms and user control. The reconciliation technique uses a set of journal files in which the history of file creation, modification, and deletion throughout the system is recorded, each journal file maintaining the portion of the history involving a particular site, or storage location. As used therein, the term "site" refers to a working directory and its sub-directories on a particular storage medium, such as a hard disk or floppy disk. The reconciliation process described in U.S. Pat. No. 5,600,834 is explicitly invoked and controlled by a user, and it operates to reconcile the versions of files and directories existing at the sites specified by the user. The process uses site directories and version entries in the journal files to determine whether there is a single current version of each file or directory, and if so copies that version to the other sites involved in the reconciliation. The process also checks for conflicts, these being indicated when different versions of a file exist in the system that appear to be derived from a common prior version. The process generally works by "merging" the sequences of version entries in each journal to reconstruct the creation/ modification/deletion history for each file at the involved sites. Date and time values, referred to as "timestamps", in the journal entries are used in this merging process to place the events from the different journals in order. The process also includes timestamps in "known site" entries used to identify the most recent time that a given site was involved in a reconciliation. This information is used to occasionally purge version entries from the journal file when it is safe to do so, in order to prevent the journal files from growing indefinitely.

The use of timestamps as described in the '834 reconciliation process can occasionally cause undesired results, because of the imperfect tracking of date and time among different computers. Under some circumstances, for example, an older version of a file existing at one site may be written over the correct version existing at another site, because the timestamps incorrectly cause the older version to appear to be more recent. This can happen, for example, when one computer has made an adjustment for Daylight Savings Time and the other computer has not yet made such an adjustment. For similar reasons, dependence on timestamps also can cause problems in the process of tracking per-site reconciliation times.

BRIEF SUMMARY OF THE INVENTION

An improved method of reconciling different file storage sites in a distributed file system is disclosed. A set of journal or log files is used to track the history of file modification at each of the different sites. The journal files contain sequences of version entries associated with each file at the corresponding site. Each version entry contains a hash code or digest that to a very high probability uniquely identifies the contents of a corresponding version of the file. During the reconciliation process, sequences of hash codes obtained from the version entries in each journal are compared with each other to determine (1) whether a conflict exists for any of the files involved in the reconciliation, and (2) if not, which version of the file is the current version. Then the current version is copied to the other sites as necessary, and the journals updated to reflect the file copying.

The hash code or digest is computed from the contents of the file according to a known message digest program such that to a very high probability the code uniquely identifies the contents of the file from which it is generated. Because different versions of a file have different contents, they likewise result in different codes. Thus the hash codes identify different versions of files independently of the files' timestamps, so that the presently-disclosed reconciliation process does not yield undesired results arising from the use of timestamps, as discussed above. The presently-disclosed process also differs from the version vector approach, because it does not depend on the sites to generate unique ascending version numbers, and it does not require that a version vector be maintained for each object.

An improved method of tracking the involvement of sites in file reconciliations is also disclosed. Each version entry in each journal file contains a site indicator field indicating which of the journal files for the other sites has a copy of the entry. When a version entry is created during a reconciliation, the site indicator field is set to a value indicating which sites are involved in the reconciliation and therefore have a copy of the version entry. When all sites have a copy of the version entry as indicated by the site indicator field, it is safe to delete any preceding version entries. Because this tracking process uses the version entries, it further exploits the uniqueness of the hash codes and avoids problems associated with the use of timestamps.

Other aspects, features, and advantages of the present invention are disclosed in the detailed description which follows.

DETAILED DESCRIPTION OF THE INVENTION

Figure 1:
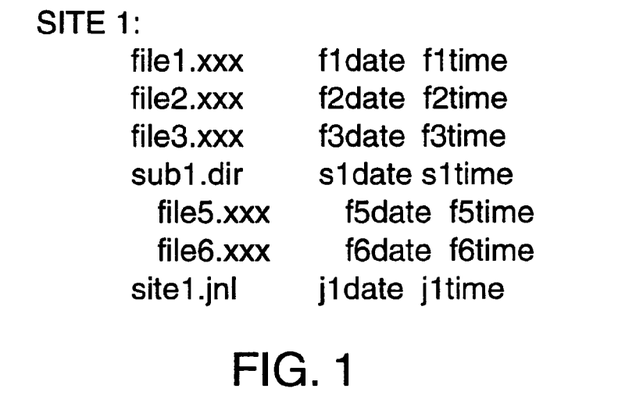
FIGS. 1 and 2 are directory listings of two data file storage sites in a computer system.
Figure 2:
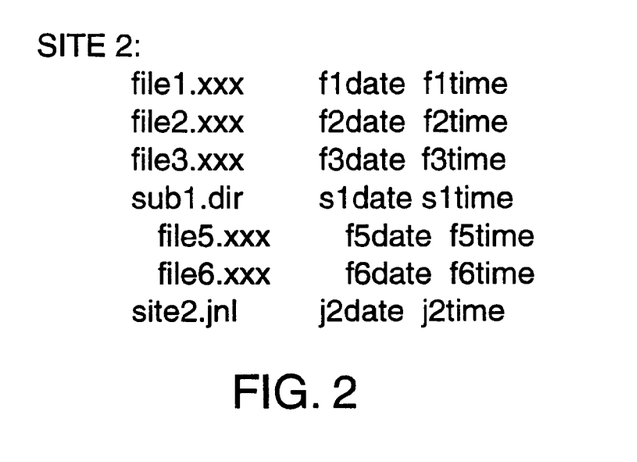

FIGS. 1 and 2 show listings of files existing at two separate sites referred to as SITE1 and SITE2 respectively. The files are listed by filename. SITE1 contains three user files file1.xxx, file2.xxx, and file3.xxx, a subdirectory sub1.dir containing two additional files file5.xxx and file6.xxx, and a journal file site1.jnl. The 'xxx' values represent file type extensions that identify the files as user data files. SITE2 contains generally the same files as SITE1, except that it contains a file file4.xxx not contained in SITE1, and it does not have file3.xxx. The journal file for SITE2 is named site2.jnl.

The user files and directory files shown in FIGS. 1 and 2 are created, read, modified, and deleted by a user of the computer system or systems on which the sites SITE1 and SITE2 reside. Further, the files and directories in the sites SITE1 and SITE2 are generally intended to mirror each other. For example, the site SITE1 may be an area on the hard disk of a user's workstation, and the site SITE2 an area on a large disk in a file server used to hold shared or backup copies of the workstation's files. Thus periodically the user files and directories at the two sites are reconciled with each other so that both sites have the latest copies of the files and directories.

Figure 3:
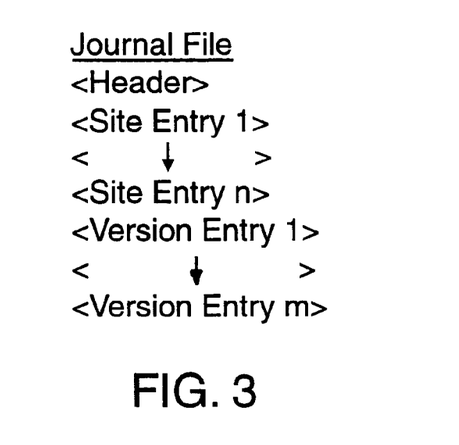
FIG. 3 is a diagram of the structure of a journal file used in the presently disclosed reconciliation process.

FIGS. 3 through 6 show the structure of a journal file. As shown in FIG. 3, a journal file consists of a Header, one or more Site entries, and one or more Version entries. There may be more than one Header, as is the case if a site has subdirectories, but Site entries are only found after the first Header line. A Site entry exists for each site that has been involved in a reconciliation. A Version entry is added to the journal file for each version of each file that has existed at a site. Version entries are purged when they become obsolete, so the Version entries in the journal file at any given time represent only the pertinent version history for each file.

Figure 4:
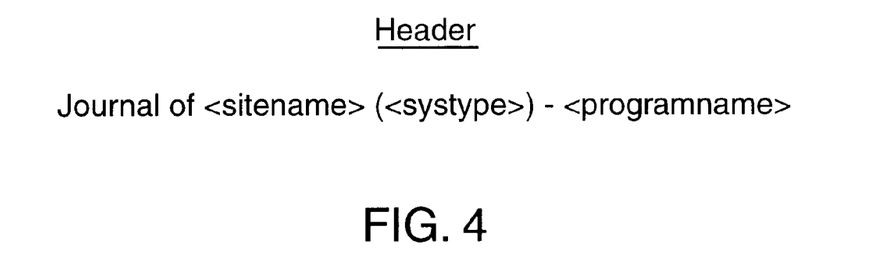
FIGS. 4 through 6 illustrate the structures of components of the journal file of FIG. 3.

The Header structure is shown in FIG. 4. The site whose history appears in the journal file is identified in a field labelled <sitename>. The Header also includes a field labelled <systype> used to identify the type of computer system on which the site resides, and a field labelled <programname> to identify the version of the reconciliation program that created the journal file.

Figure 5:
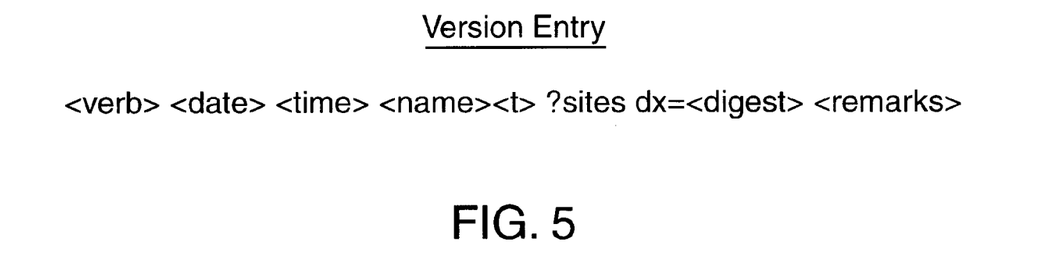

As shown in FIG. 5, a Version entry includes several fields, these being described as follows:

| | |
|---|---|
| <verb> | An action performed:<br>+ Created or Modified<br>− Deleted |
| <date> | Date action performed |
| <time> | Time action performed |
| <name> | Name of file acted on |
| <t> | Type of file acted on:<br>(blank) Ordinary file<br>/ Subdirectory<br>@ Symbolic Link |
| ?sites | Bit field indicating which sites do NOT know about this Version; omitted if Version known at all sites. Bit-to-site mapping defined in the mask field of Site entries. |
| <digest> | Unique hash code or digest of the contents of the file that resulted from the action. "dt" prefix indicates file is a text file; "db" indicates binary file. |
| <remarks> | Remark whose use depends on context. Two special remarks are:<br>!was <name>      (saved file)<br>!deleted <name>  (deleted directory) |

Figure 6:
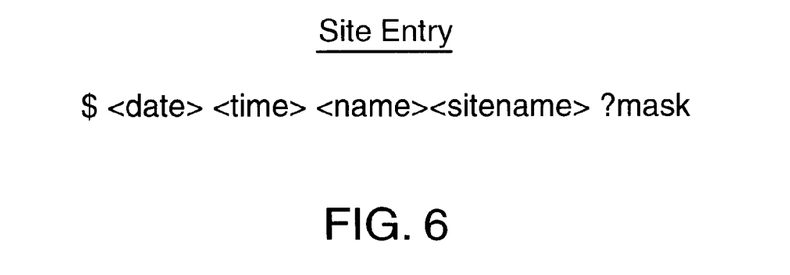

As shown in FIG. 6, a Site entry includes several fields, these being described as follows:

| | |
|---|---|
| <date> | Date site last involved in reconciliation |
| <time> | Time site last involved in reconciliation |
| <sitename> | Name of site |
| ?mask | Bit mask to be used for this site in site field of Version entries |

Based on the above description, the following shows exemplary journal files for the sites shown in FIGS. 1 and 2:

```
Journal of SITE1

$ <date> <time> SITE2 ?1
$ <date> <time> SITE1 ?2
+ f1date f1time file1.xxx dt = aaaaa
+ f2date f2time file2.xxx dt = bbbbb
+ f3date f3time file3.xxx dt = aaaaa
+ s1date s1time sub1.dir/
Journal of SITE1/sub1.dir + f5date f5time file5.xxx dt = eeeee
+ f6date f6time file6.xxx dt = fffff
Journal of SITE2

$ <date> <time> SITE2 ?1
$ <date> <time> SITE1 ?2
+ f1date f1time file1.xxx dt = aaaaa
+ f2date f2time file2.xxx dt = bbbbb
+ f4date f4time file4.xxx dt = ddddd
+ s1date s1time sub1.dir/
Journal of SITE2/sub1.dir + f5date f5time file5.xxx dt = eeeee
+ f6date f6time file6.xxx dt = fffff
```

Figure 7:
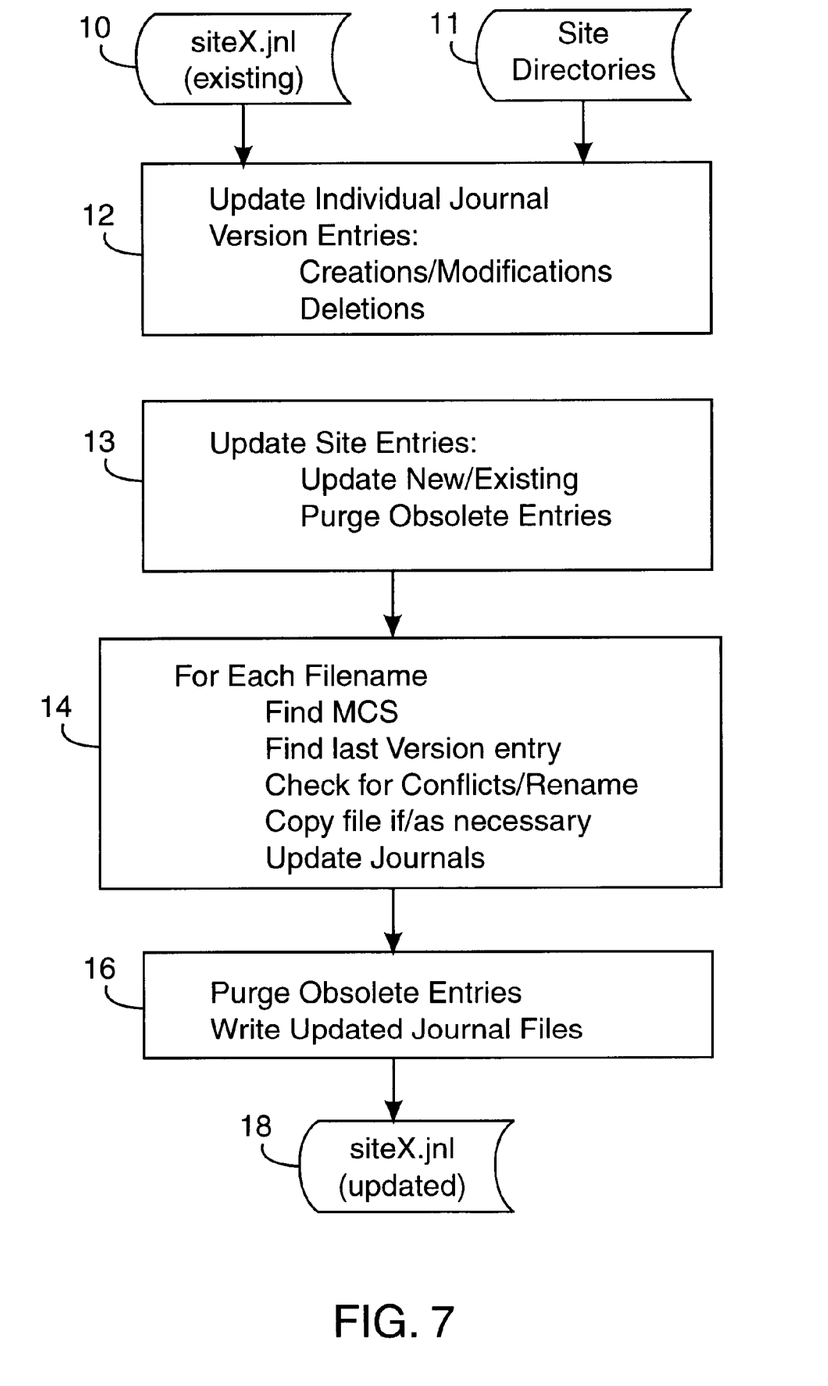
FIG. 7 is a flow diagram of the presently disclosed reconciliation process.

FIG. 7 illustrates the reconciliation process. The process reads the existing journal files 10 and directories 11 associated with each site involved in the reconciliation. At step 12, the Version entries in the journals for each site are updated to reflect the current versions of the files and directories at the respective sites. First the actual contents of the sites involved in the reconciliation are determined by reading the site directories and sub-directories. New "+" Version entries are created for those files and directories that either (1) have no corresponding Version entries (and are therefore assumed to be newly created), or (2) have a date and time different from the date and time included in the last Version entry for that file or directory in the journal file (and are therefore assumed to have been changed). The method by which "+" Version entries are created is described in greater detail below with reference to FIG. 8.

In a file has a corresponding Version entry and the timestamps match, then the version of the file existing at the site is consistent with the last Version entry for that file. In this case, a new Version entry is not created. In this manner, the unnecessary re-calculation of digests is avoided. Because the calculation of digests is compute-intensive, this feature of creating new digests for only new or modified files enhances the performance of the reconciliation process.

It is possible that the latest "version" of a file is actually its deletion. A pass is made through the journal to determine if any files or directories named in existing Version entries have been deleted from the file system. For any such files, new "−" Version entries including the names of the deleted files or directories are created, indicating that the last action taken was the deletion of the file at the corresponding site.

As the journals are read in step 12, their Site entries are merged into a single master list of known sites, including both those sites which are participating in the current reconciliation and also other sites mentioned in the journals. The master list also contains the mask bits to be used in the new journals, and a date and time of the last known reconciliation for each site. The Site entries are then updated in step 13 as follows: First, the entry for each site involved in the current reconciliation is updated to contain the current time. Then, obsolete sites (which have not been heard from for a long time, such as one month) are purged. The resulting list of sites, including those not participating in the current reconciliation, will eventually be included in all the new journals for the participating sites.

It should be noted here that the assignment of mask bits to sites is meaningful only within a particular journal. When journals are merged as described above, the mask bits in both the Site and the Version entries are re-mapped appropriately to maintain the associations between versions and sites. In the illustrated embodiment, the mask bits are assigned to sites as follows: The first site mentioned in a journal is given mask value 1, the second site is given mask 2, the third is given mask 4, the fourth is given mask 8, and so on. This assignment is arbitrary, and may be done in other ways in alternative embodiments. When a site is abandoned, its corresponding mask bit is freed for use by another site. Later sites automatically move up to fill in the gap created.

The reconciliation process then proceeds to step 14. First, the sequences of Version entries for each filename in the journals are compared. This process employs an algorithm known as the "maximum common subsequence" or MCS algorithm. The MCS algorithm finds a subsequence of "common" Version entries for each filename, i.e., Version entries that are contained in all of the journal files for the sites being reconciled, if such a subsequence exists. This common subsequence forms the basis for further action by the reconciliation process.

The next step is to identify the last Version entry appearing in any journal file after the last common entry, if such an entry exists. If no journal file has a version entry for a data file after the last common version entry, then the current version of the file already exists at each site. In this case, no further reconciliation action needs to be taken for that file. Otherwise, the next step is to check for conflicts. A conflict exists when either (1) no common subsequence exists for the filename in the journals of the sites being reconciled, or (2) different Version entries exist in two or more journals after the last common Version entry. In either case it is not possible for the reconciliation process to determine from the hash codes which version is the most up to date. In this case, one of the conflicting versions is renamed using a unique and distinctive name, thus eliminating the conflict. The choice of which version to rename is arbitrary; one simple way to choose is to pick the version having an earlier timestamp. After this renaming, both conflicting versions are replicated to other sites as necessary, and the user is notified so that the two files may be compared and appropriate remedial action taken.

If no conflict is found for a given filename, then the current version of the file, which exists at a site whose journal file has a Version entry subsequent to the last common Version entry, is copied to the other sites. Often the current version exists at only one site. However, it is possible for the current version to exist at more than one site before any copying is done. In such a case, the version is copied from any of the sites where it exists, and is copied to only those sites where the current version does not exist. As the copying takes place, new "+" Version entries are appended to the journals for the sites receiving the current version of the file.

It may be that the file is being copied between two different types of systems, for example from a UNIX system to a Windows system. These systems use different characters to indicate the end of a line of text in text files. In such a case, the end-of-line characters are modified during the file copying process as necessary to ensure proper compatibility with the target system. As noted below, these minor modifications to text files do not affect the ability of the hash code to uniquely identify the file, and so the hash code can be copied unmodified.

If the last Version entry after the latest Version entry in the MCS is a "−" Version entry, indicating that the file has been deleted, the file is deleted from those sites where it still exists, and "−" Version entries are appended to the journals accordingly.

In step 16 the journals are inspected again to purge obsolete Version entries, in order to prevent the journal files from growing indefinitely. A Version entry becomes obsolete when it either (1) precedes any Version entry common to all journals, or (2) is older than some reasonable age, for example one month. This latter action is taken to handle old deletions, or "−" entries, which are typically the last entries for files and so do not precede other Version entries for those files. After the obsolete Version entries have been purged, the updated journals are written back out as updated journal files 18 for use in a subsequent reconciliation.

It should be noted that in the foregoing description the last Version entry in the MCS is especially important, because it represents the most recent time that all of the sites saw a given version of the file. Further, the most recent Version entries in the journals are also especially important, because they represent what versions are currently stored at the sites. Thus a version of the MCS algorithm is used that reflects the weight of these entries, giving preference to matching recent and currently existing Versions. This weighting is sensible for the reconciliation process as described, which attempts to bring all sites up to date. However, other weightings of the Version entries are possible, and may be preferred in alternative embodiments of the reconciliation process.

Figure 8:
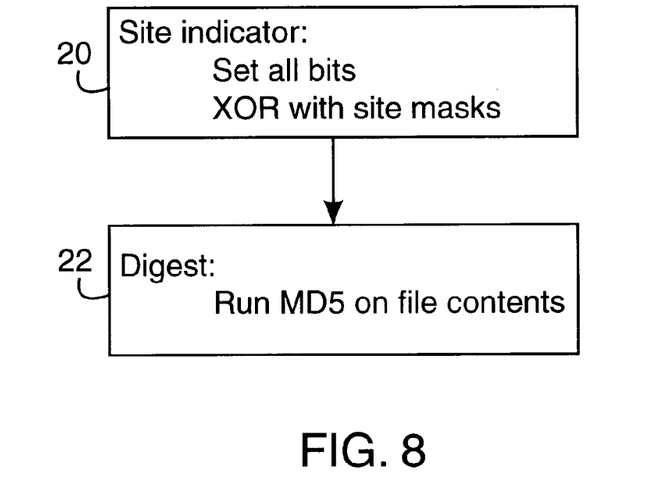
FIG. 8 is flow diagram of part of the process by which version entries in the journal file of FIG. 3 are created during the reconciliation process of FIG. 7.

The creation of the "+" Version entries shown in FIG. 5 is now described with reference to FIG. 8. At the time a Version entry is created, the values to be included in the date, time, name, and type fields are known, so these are simply inserted in their respective fields. The site indicator is created as shown in step 20. When a Version entry is first created, its mask is set for all sites, except for the site at which the version is created, indicating that it is unknown at all sites but that one site. Successful reconciliations of this Version with other sites result in resetting corresponding mask bits for the Version, indicating that the Version is known at the additional sites. The masks are preserved from reconciliation to reconciliation. When all of its mask bits have been reset, the Version is known to have been propagated everywhere. Once a Version is known everywhere, all previous Version entries for the same file are obsolete and may be safely discarded.

The hash code or digest is created in step 22. A procedure known as Message Digest version 5 (MD5) is run using the contents of the file as its input. Based on this input, MD5 computes a 16-byte (128-bit) digest that has an extremely high probability of uniquely identifying the file among all possible files, including earlier and later versions of the same file. The ability to uniquely identify a file is due in part to the large number of possible codes, which is on the order of $10^{40}$ or roughly one million to the one-millionth power. There are also other ways in which a hash code could be generated. It is desirable to use an algorithm that yields an acceptably low rate of false matches.

For text files, end-of-line characters are ignored in the computation of the digest. This feature enables the transparent modification of these characters when files are being copied between different types of systems, as discussed above. This feature is an optimization; it may be useful in alternative embodiments to include these characters in the digest computation.

EXAMPLES

Figure 9:
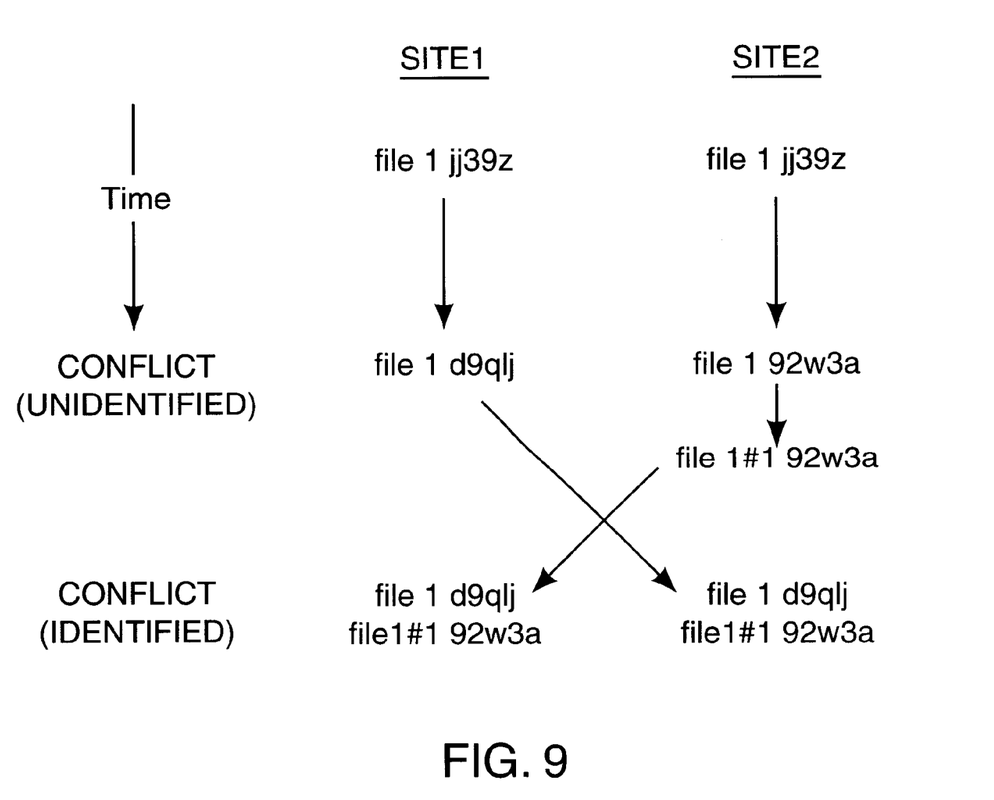
FIGS. 9–11 are time line diagrams depicting examples of activity affecting files involved in reconciliation.
Figure 10:
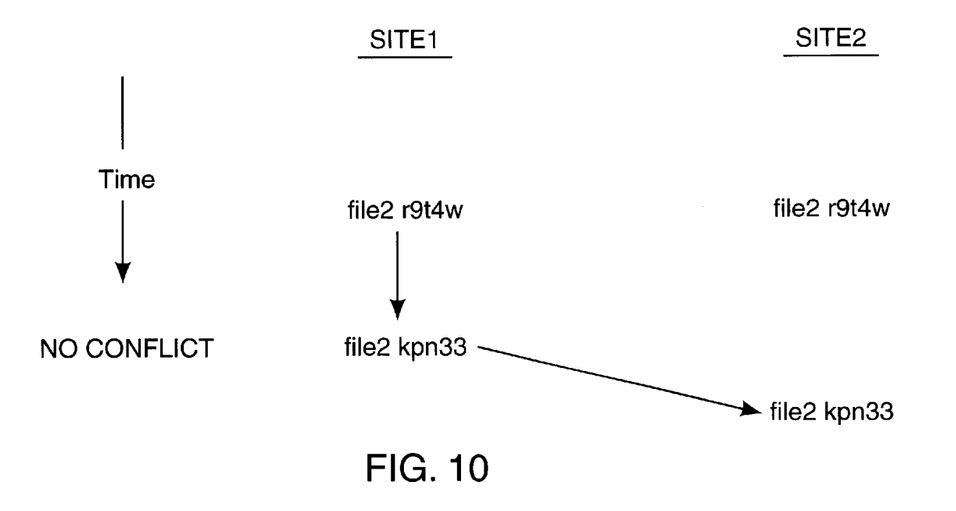
Figure 11:
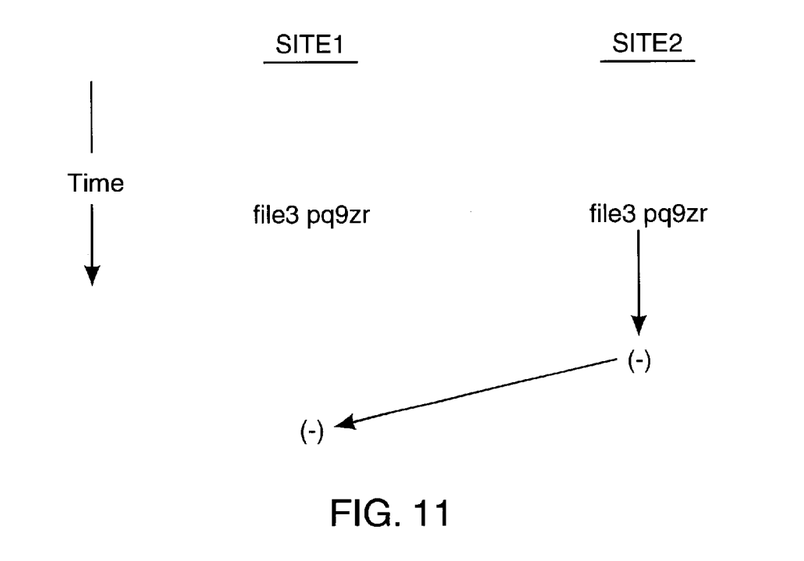

Examples are given below to illustrate the presently-disclosed reconciliation process and its results. Example 1 is the normal, no-conflict case. Example 2 shows a conflict. Examples 3 and 4 illustrate the creation of Site entries and the purging of obsolete Version entries. FIGS. 9–11 represent the sequences of modifications and copying that yield the scenarios below for file1, file2 and file3 respectively. The vertical arrows indicate modification and the horizontal arrows indicate copying. The file extensions have been removed to reduce extraneous detail, and 5-bit alphanumeric values are used to represent hash codes calculated from different versions of the files. In practice the hash codes are much longer strings, as discussed above.

Example 1

No Conflict

1. Existing journal files (from some previous reconciliation):

| SITE1 | SITE2 |
|---|---|
| + file1  jj39z | + file1  jj39z |
| + file2  r9t4w | + file2  r9t4w |
| + file3  pq9zr | + file3  pq9zr |

2. Current site directories, showing modification of file2 at site 1 and deletion of file3 at site 2 since the previous reconciliation:

| SITE1 | SITE2 |
|---|---|
| file1  jj39z | file1  jj39z |
| file2  kpn33 | file2  r9t4w |
| file3  pq9zr | |

3. Results of initial update of journals, reflecting the current contents of the sites. New Version entries for file2 at site 1 and file3 at site 2 have been added.

| SITE1 | SITE2 |
|---|---|
| + file1 jj39z | + file1 jj39z |
| + file2 r9t4w | + file2 r9t4w |
| + file2 kpn33 | |
| + file3 pq9zr | + file3 pq9zr |
| | − file 3 |

4. Result of merging and conflict checking. Matches between most recent versions of files are indicated by dashed lines. The new version of file2 and the deletion of file3 are detected because the corresponding Version entries appear after the most recent common entries for those files.

| SITE1: | SITE2: |
|---|---|
| + file1 jj39z | ---- + file1 jj39z |
| + file2 r9t4w | ---- + file2 r9t4w |
| + file2 kpn33 | |
| + file3 pq9zr | ---- + file3 pq9zr |
| | − file3 |

5. Result of copying file2, deleting file3, and updating the journals accordingly:

| SITE1 | SITE2 |
|---|---|
| + file1 jj39z | + file1 jj39z |
| + file2 r9t4w | + file2 r9t4w |
| + file2 kpn33 | + file2 kpn33 |
| + file3 pq9zr | + file3 pq9zr |
| − file3 | − file3 |

6. Corresponding updated site contents:

| SITE1 | SITE2 |
|---|---|
| file1 jj39z | file1 jj39z |
| file2 kpn33 | file2 kpn33 |

7. Result of purging old versions from the journals, assuming no other sites exist:

| SITE1 | SITE2 |
|---|---|
| + file1 jj39z | + file1 jj39z |
| + file2 kpn33 | + file2 kpn33 |
| − file3 | − file3 |

Example 2
Reconciliation with a Conflict
Continuing from the site contents and journals in 6 and 7 above, suppose the versions of file1 at both sites are updated inconsistently.
8. New site contents after conflicting updates to file 1:

| SITE1 | SITE2 |
|---|---|
| file1 d9qlj | file1 92w3a |
| file2 kpn33 | file2 kpn33 |

9. Result of updating journals to reflect new site contents, followed by merging and conflict detection:

| SITE1 | SITE2 |
|---|---|
| + file1 jj39z | ---- + file1 jj39z |
| + file1 d9qlj | + file1 92w3a |
| + file2 kpn33 | ---- + file2 kpn33 |
| − file3 | ---- − file3 |

A conflict is detected for file1 because the last common version is followed by non-matching versions at both sites.
10. Site contents as result of renaming one of the conflicting versions:

| SITE1 | SITE2 |
|---|---|
| file1 d9qlj | file1#1 92w3a |
| file2 kpn33 | file2 kpn33 |

11. Corresponding updated journals:

| SITE1 | SITE2 |
|---|---|
| + file1 jj39z | ---- + file1 jj39z |
| + file1 d9qlj | + file1#1 92w3a |
| + file2 kpn33 | ---- + file2 kpn33 |
| − file3 | ---- − file3 |

"file1#1" is a new, unique file name assigned by the reconciliation program. Now there is a new file at each site.
12. Result of copying the new versions to make both sites consistent:

| SITE1 | SITE2 |
|---|---|
| file1 d9qlj | file1 d9qlj |
| file1#1 92w3a | file1#1 92w3a |
| file2 kpn33 | file2 kpn33 |

13. Resulting journals:

| SITE1 | SITE2 |
|---|---|
| + file1 jj39z | + file1 jj39z |
| + file1 d9qlj | + file1 d9qlj |
| + file1#1 92w3a | + file1#1 92w3a |

-continued

| SITE1 | SITE2 |
|---|---|
| + file2 kpn33 | + file2 kpn33 |
| − file3 | − file3 |

14. Assuming that no other sites exist, obsolete versions can be purged, resulting in:

| SITE1 | SITE2 |
|---|---|
| + file1 d9qlj | + file1 d9qlj |
| + file1#1 92w3a | + file1#1 92w3a |
| + file2 kpn33 | + file2 kpn33 |
| − file3 | − file3 |

Example 3

Creation of Site Entries

1. Assuming the above reconciliation between sites SITE1 and SITE2 as a beginning point, the Site entries in each journal file are as follows:

```
            site1.jnl:
$   date1   time1   SITE1   ?01
$   date1   time1   SITE2   ?02
            site2.jnl:
$   date1   time1   SITE1   ?01
$   date1   time1   SITE2   ?02
```

2. Subsequently, a reconciliation is performed between SITE1 and a new site, SITE3. The new Site entries are as follows:

```
            site1.jnl:
$   date2   time2   SITE1   ?01
$   date1   time1   SITE2   ?02
$   date2   time2   SITE3   ?04
            site2.jnl (unchanged):
$   date1   time1   SITE1   ?01
$   date1   time1   SITE2   ?01
            site3.jnl:
$   date2   time2   SITE1   ?01
$   date1   time1   SITE2   ?02
$   date2   time2   SITE3   ?04
```

Example 4

Managing Site Indicators and Purging Old Versions

1. Examples 1 and 2 assumed that only SITE1 and SITE2 existed. If there had been another site, say SITE3 with site mask ?4, the older journal entries would not have been purged and the journals would have contained:

| SITE1 (?1) | SITE2 (?2) | SITE3 (?4) |
|---|---|---|
| + file1 jj39z | + file1 jj39z | + file1 jj93z |
| + file1 d9qlj ?4 | + file1 d9qlj ?4 | |
| + file1#1 92w3a ?4 | + file1#1 92w3a ?4 | |
| + file2 r9t4w | + file2 r9t4w | + file2 r9t4w |
| + file2 kpn33 ?4 | + file2 kpn33 ?4 | |
| + file3 pq9zr | + file3 pq9zr | + file3 pq9zr |
| − file3 ?4 | − file3 ?4 | |

The obsolete entry for file1 (jj39z), for example, can not be purged because the entry that follows it (d9qlj) is not yet known at all sites.

2. Now if a reconciliation is performed between SITE2 and SITE3 (but not SITE1), the appropriate files would be copied to SITE3 and their journals would be updated to reflect this:

| SITE1 | SITE2 | SITE 3 (?4) |
|---|---|---|
| + file1 jj39z | + file1 jj39z | + file1 jj39z |
| + file1 d9qlj ?4 | + file1 d9qlj | + file1 d9qlj |
| + file1#1 92w3a ?4 | + file1#1 92w3a | + file1#1 92w3a |
| + file2 r9t4w | + file2 r9t4w | + file2 r9t4w |
| + file2 kpn33 ?4 | + file2 kpn33 | + file2 kpn33 |
| + file3 pq9zr | + file3 pq9zr | + file3 pq9zr |
| − file3 ?4 | − file3 | − file3 |

3. Obsolete entries can now be purged from the journals at SITE2 and SITE3 since the new entries are known to be present at all sites:

| SITE1 (?1) | SITE2 (?2) | SITE3 (?4) |
|---|---|---|
| + file1 jj39z | | |
| + file1 d9qlj ?4 | + file1 d9qlj | + file1 d9qlj |
| + file1#1 92w3a ?4 | + file1#1 92w3a | + file1#1 92w3a |
| + file2 r9t4w | | |
| + file2 kpn33 ?4 | + file2 kpn33 | + file2 kpn33 |
| + file3 pq9zr | | |
| − file3 ?4 | − file3 | − file3 |

The journal at SITE1 will be purged the next time it is reconciled with either SITE1 or SITE3.

An improved file reconciliation process has been described having application to a variety of distributed file systems. The disclosed reconciliation process is susceptive of modification in many ways. For example, it would be possible when updating Version entries to create new Version entries for all files and directories found at a site, without regard to whether their contents have changed as indicated by the timestamps. This change would simplify the process somewhat, but at the cost of degraded performance, due to the compute-intensive and unnecessary re-calculation of digests for unchanged files. And as mentioned above, the specific digest algorithm could be any of a number of algorithms that yield suitably unique digests.

Also, the Version entries in the journal files could receive different weighting with respect to their position in the sequence of Version entries. For example, some Version entries, as specified by a user, could be ignored entirely, based either on position in the sequence or timestamp. Such an approach might be useful, for example, if sites are to be reconciled only up to some earlier date or up to some earlier existing version.

As described the disclosed reconciliation process relies upon the ability of the processor on which the process is running to directly access the files and directories at each site. Other mechanisms may be employed to carry out file operations. For example, the reconciliation process could be run as an independent process on each computer, and a signalling and file-exchange protocol used between the independent processes to carry out the reading and writing of directory, data and journal files.

It will be apparent to those skilled in the art that other modifications to and variations of the above-described methods and apparatus are possible without departing from the inventive concepts disclosed herein. Accordingly, the invention should be viewed as limited solely by the scope and spirit of the appended claims.

What is claimed is:

1. A method of reconciling different data file storage sites, comprising the steps of:

generating hash codes, each hash code uniquely identifying a corresponding version of a data file by the contents thereof;

storing the generated hash codes in journal files associated with the sites, the hash codes in each journal file being stored in a sequence indicating the order in which different versions of the data file have been stored at the corresponding site;

analyzing the sequences of hash codes from the journal files to determine (1) which version of the data file is the current version, (2) the site or sites at which the current version is stored, and (3) the site or sites at which the current version is not stored; and copying the current version of the data file from a site at which it is stored to the site or sites at which it is not stored.

2. A method according to claim 1, wherein:

the analyzing step includes determining whether a conflict exists among the sites, a conflict existing when two or more journal files have different hash codes subsequent to a last common hash code, the last common hash code being the most recently generated one of those hash codes appearing in every one of the journal files;

the copying step includes copying the data file from a site whose journal file has a hash code subsequent to the last common hash code to the site or sites whose journal files have no hash code subsequent to the last common hash code; and the copying step is performed only if a conflict is determined not to exist.

3. A method according to claim 2, further comprising the steps of:

if a conflict is determined to exist, renaming one of the conflicting versions of the file in a manner that distinguishes the one conflicting version from the other conflicting version and also indicates the presence of the conflict; and copying the conflicting versions of the file to others of the sites so that both conflicting versions of the file are present at all sites.

4. A method according to claim 1, wherein the hash-code storing step includes copying the hash code identifying the current version of the data file, the hash code being copied from the journal file for the site from which the data file is copied, and the hash code being copied to the journal file for each site to which the data file is copied.

5. A method according to claim 1, wherein:

the journal files include sequentially-arranged version entries, each version entry being associated with a corresponding version of the data file having been stored at the corresponding site;

each hash code is included in a corresponding one of the version entries;

each version entry includes a timestamp indicating the time at which the version of the data file identified by the hash code included with the version entry was created; and the hash-code generating step includes: (1) determining from the timestamp in the last sequential version entry for the data file in a journal file whether the data file at the site associated with the journal file has been modified since the creation of the last version entry; (2) generating the hash code for the data file if the data file has been modified since the creation of the last version entry; and (3) refraining from generating the hash code for the data file if the data file has not been modified since the creation of the last version entry; and the hash-code storing step includes appending a new version entry to the sequence of version entries in the journal file if the data file has been modified, the appended version entry including the hash code generated for the modified data file.

6. A method according to claim 1, wherein (1) each hash code is included in a corresponding one of a sequence of version entries in the journal files, and (2) each version entry in the journal files includes a site indicator field, the site indicator field having sub-fields, each sub-field corresponding to a different one of the sites and indicating whether the version entry containing the sub-field appears in the journal file for the site corresponding to the sub-field, and further comprising the steps of:

determining from the site indicators in the journal files whether there are version entries in the journal files that have become obsolete such that their deletion from the journal files would not deleteriously affect future reconciliations; and deleting the version entries determined to be obsolete.

7. A method according to claim 6, wherein the determining step comprises determining whether there are any version entries in the journal files preceding an earliest version entry common to all the journal files; and wherein the deleting step comprises deleting the version entries determined to precede the earliest common version entry.

8. A method according to claim 1, wherein the journal files include sequentially-arranged version entries, each version entry being associated with a corresponding version of the data file having been stored at the corresponding site, and version entry including a file type indicator indicating whether the file is in binary or text format, and further comprising the steps of:

determining whether the file is a text file and whether the file is being copied between systems using different characters to indicate the end of a line in text files; and if the file is a text file and the file is being copied between such systems, then changing the end-of-line characters appearing in the file to be compatible with the system to which the file is being copied.

9. In a system including data storage sites and a set of journal files associated therewith, each journal file being associated with a corresponding one of the sites and including entries indicating which versions of a data file have appeared at the site, the journal entries being updated during a process of reconciling the contents of the sites, a method of tracking which journal files contain copies of version entries appearing in one of the journal files, comprising the steps of:

storing masks in the one journal file, each mask being a predetermined data value associated with and uniquely identifying a corresponding one of the sites;

storing site indicator fields in the one journal file, each site indicator field being associated with a corresponding one of the journal entries in the one journal file and containing sub-fields, each sub-field indicating, when set to a predetermined value, whether a corresponding one of the journal files has a copy of the journal entry with which the site indicator containing the sub-field is associated; and upon updating a journal entry in the one journal file during the process of reconciling the one site with another site, setting each of the sub-fields of the site indicator according to a value based on the initial value of the sub-field and the mask associated with each site, such that the site indicator is a persistent record of the journal files in which a copy of the journal entry has appeared.

10. A method for reconciling different versions of a file, comprising the steps of:

generating, for each different version of the file, a hash code from the data content stored in each different version of the file;

storing the hash codes in a journal file in an order in which the different versions of files were stored; and analyzing the ordered hash codes in the journal file to identify a current version of the file.

* * * * *